United States Patent Office 3,484,478
Patented Dec. 16, 1969

3,484,478
SYNTHESIS OF MONOESTERS OF ITACONIC ACID
Ezekiel H. Hull, Elon College, N.C., assignor to Chas. Pfizer & Co., Inc., New York, N.Y., a corporation of Delaware
No Drawing. Filed Jan. 11, 1966, Ser. No. 519,976
Int. Cl. C07c 67/00, 69/52
U.S. Cl. 260—485                        3 Claims

ABSTRACT OF THE DISCLOSURE

Esterification of itaconic acid with a primary monoalkanol wherein the reaction is initiated in the presence of from 0.1 to about 1.0 mole of water per mole of alcohol reactant and water is maintained in the reaction mixture throughout the course of esterification for the purpose of enhancing the monoester product yield.

---

This invention relates to an improvement in the synthesis of organic esters. More particularly, it is concerned with a means to obtain monoesters of itaconic acid substantially free from by-product diesters, which have much less commercial value in certain applications.

The present invention is an improvement in the preparation of beta-itaconic acid monoesters by esterifying itaconic acid at a temperature of from about 75 to about 175° C. with monoalkanols, having from 1 to 4 carbon atoms, which comprises initiating the esterification in the presence of from about 0.1 to about 1.0 mole of water per mole of alcohol reactant and maintaining in the reaction mixture throughout the course of the esterification, at least the initial amount of water and up to 1.5 moles of water per mole of alcohol reactant introduced into the reaction mixture. While commercial grade alcohols ordinarily contain small amounts of water, for example, methyl alcohol contains about 0.003 mole of water per mole of alcohol and n-butyl alcohol contains about 0.01 mole of water per mole of alcohol, and water is generated during the course of the reaction, this water is continuously removed, by the prior art methods, in order to drive the reaction to completion. We have found that when the reaction is initiated and conducted in the presence of from about 0.1 to about 1.0 mole of water per mole of alcohol, the final product contains about 95% monoester and from 3 to 5% diester. This small amount of diester does not seriously affect product quality and virtually all of the unreacted itaconic acid can be recovered. We have also found that if the reaction is initiated and conducted in the presence of less than 0.1 mole of water per mole of alcohol, we obtain excess diester. However, if the reaction is initiated and conducted in more than 1.5 mole of water per mole of alcohol, the reaction time increases and yields are reduced.

The prior art methods of preparing esters, which involve the continuous removal of water, result in a product containing about 20% diester, which when hydrolyzed is converted to the alpha-monoester. The alpha-monoester is of less commercial value than the beta-monoester of this invention. Furthermore, a minimum of six laborious and time-consuming phase separations are required to separate the diester from the beta-monoester.

Itaconic acid is a freely-available unsaturated dicarboxylic acid. Its commercial utility, to a great extent, is derived from the ability of this acid to undergo addition polymerization reactions through its double bond. Vinyl polymers and copolymers made from itaconic acid contain pendant carboxyl groups, which confer advantageous properties such as improved adhesion when used as coatings, and the ability to be crosslinked with difunctional compounds where hard, insoluble materials are desired.

Because itaconic acid is soluble in water (8 g. dissolve in 100 ml. of $H_2O$), certain disadvantages sometimes follow when the free acid is used as a monomer. For example, in emulsion and suspension polymerization systems, itaconic acid does not tend to remain in the oil phase throughout the polymerization, making necessary special systems to prevent extraction into the aqueous phase. This disadvantage is overcome in the art by using an ester of itaconic acid and then hydrolyzing the ester group after polymerization; this results in an increased carboxyl content and enhancement of the properties outlined above. Of particular interest are the beta-monoesters of itaconic acid and particularly the beta-monobutyl ester, which are insoluble in water but completely miscible with common vinyl monomers, and from which the ester group is readily removed. The alpha-monoesters, obtained by hydrolyzing the by-product diesters, are not readily hydrolyzed to the acid and the advantages noted above for the beta-monoesters are not realized.

A preferred embodiment of this invention comprises reacting a monoalkanol, having from 1 to 4 carbon atoms, with itaconic acid at a temperature of from about 75 to 175° C. to form the beta-itaconic acid monoester. While primary monoalkanols are preferred, secondary monoalkanols may also be used. The reaction is initiated with and conducted in the presence of from about 0.1 to 1.0 mole of water per mole of alcohol reactant. With methyl alcohol, 0.1 to 0.3 mole of water is preferred and with n-butyl alcohol, 0.8 to 1.0 mole of water is preferred. The esterification is conducted so that at least said initial amount of water and up to 1.5 moles of water per mole of alcohol reactant introduced into the reaction mixture are maintained in the reaction mixture throughout the course of the esterification. When the total amount of water exceeds 1.5 moles per mole of alcohol reactant, substantial reductions in total yield result. Good yields of product containing high ratios of beta-monoester to diester are obtained by the preferred procedure of maintaining the total water at levels equal to that initially added plus that formed during the reaction. While water may be removed during the course of the reaction, by such means as azeotropic distillation, in order to reduce the water present to the minimum levels and thereby increase the total conversion of acid to ester, it is neither convenient nor necessary to do so since unconverted acid may be easily recovered from the product by such means as filtering the reaction mixture, and reacting it again.

While it is not essential to use an esterification catalyst, it is preferred to do so mainly for the reason that the reaction time can be shortened. Any standard catalyst employed in the art of esterification can be used, if desired. For example, it is convenient to use sodium bisulfate or an acidic ion exchange resin, and the like.

As those skilled in the art will realize, use of less than 1 mole of alcohol per mole of acid will result in reduced yields of the desired monoester. Accordingly, it follows that preferred results are obtained in the present process by using at least one mole of alcohol per mole of acid. On the other hand, the present process has the unexpected advantage that as high as 2.5 moles, or more, of alcohol per mole of acid may be employed, without significantly increasing diester by-product formation. Indeed, preferred results are obtained in terms of high quality, high yield of monoester product, when about 2.25 moles of alcohol are employed per mole of acid.

The following examples are illustrative of the process of this invention. They are not to be construed as limiting its scope in any manner whatsoever.

EXAMPLE I

To a 1-liter, 3-neck, round-bottom flask, equipped with a mechanical stirrer, reflux condenser and thermometer are added the following reagents:

| | | |
|---|---|---|
| 130 grams | Itaconic acid (ICA) | 1.0 mole. |
| 72 grams | Methyl alcohol, commercial grade | 2.25 moles. |
| 8.10 grams | Water (0.2 mole/mole of alcohol) | 0.45 mole. |
| 2.6 grams | $NaHSO_4$ | 2% based on ICA. |
| 0.065 gram | Methylene blue (polymerization inhibitor). | 0.02% based on charge. |

The commercial grade methyl alcohol contains 0.2% water equivalent to 0.003 mole per mole of alcohol. The reaction mixture is heated under total reflux. Acidity as itaconic acid is determined every ½ hour after 3 hours. After 6 hours, the pressure is reduced to 10 mm. Hg and methanol and water are removed at 95° C. The mixture is cooled slightly and ½ volume of benzene is added. Then the mixture is cooled to 55° C., and excess itaconic acid is filtered from the mixture. About 28 grams or 0.22 mole of acid is recovered. The clear product is recovered by distilling off the benzene. There is obtained 110 grams of product, M.P. 62–65° C., which contains 97.5% of the monoester as determined by acidity titration. The 1.0 mole of itaconic acid is converted to 0.74 mole monoester, 0.22 mole is recovered as ICA, 0.01 mole is converted to diester and 0.03 mole is lost in the reaction.

When the same procedure is repeated under total reflux without the initial addition of water, 110 grams of product are recovered which analyzes 80% monoester. The 1.0 mole of itaconic acid is converted to 0.76 mole of monoester, 0.18 mole of diester and 0.02 mole of acid is recovered.

EXAMPLE II

To a 1-liter, 3-neck, round-bottom flask, equipped with a mechanical stirrer, reflux condenser and thermometer are added the following reagents:

| | | |
|---|---|---|
| 130 grams | Itaconic acid (ICA) | 1.0 mole. |
| 166.5 grams | n-Butyl alcohol, commercial grade | 2.25 moles. |
| 36.45 grams | Water (0.9 mole/mole of butanol) | 2.025 moles. |
| 2.6 grams | $NaHSO_4$ | 2% based on ICA. |
| 0.065 gram | Methylene blue | 0.02% based on charge. |

The commercial grade n-butyl alcohol contains 0.2% water equivalent to 0.01 mole per mole of alcohol. The reaction mixture is heated under total reflux at 101° C. The acidity as ICA is checked every ½ hour after 2 hours. After 5 hours, the amount of acidity calculated as itaconic acid levels off at 28 to 29%. The mixture is cooled to 50° C. and the pressure is reduced to 10 mm. Hg. The mixture is distilled to 100° C. to free it of butyl alcohol. The residue is cooled slightly and 300 ml. of benzene is added. The suspension is then cooled to 30° C. and about 46 grams of unreacted acid separates and is recovered by filtration. The benzene is removed by distillation at 10 mm. Hg pressure. There is obtained 125 grams of product, M.P. 32–35° C., with a monobutyl itaconate content of 95.5%. The 1.0 mole of itaconic acid is converted to 0.62 mole monoester, 0.02 mole diester and 0.35 mole is recovered as itaconic acid.

When the same procedure is repeated under total reflux except that water is not added initially, the resulting product, 150 grams, assays 80.9% monobutyl itaconate. The 1.0 mole of itaconic acid is converted to 0.65 mole of monoester, 0.12 mole of diester and 0.23 mole of acid is recovered.

When the procedure is repeated without the initially added water and where the water formed during the reaction is continuously removed by azeotropic distillation with benzene, the reaction goes to completion and the resulting product, which weighs 200 grams, contains 75% monobutyl itaconate. The 1.0 mole of acid is converted to 0.81 mole of monoester and 0.19 mole of diester.

EXAMPLE III

To a 1-liter, 3-neck, round-bottom flask, equipped with a mechanical stirrer, reflux condenser and thermometer are added the following reagents:

| | | |
|---|---|---|
| 130 grams | Itaconic acid (ICA) | 1.0 mole. |
| 166.5 grams | n-Butyl alcohol, commercial grade | 2.25 moles. |
| 36.45 grams | Water (0.9 mole/mole of alcohol) | 2.025 moles. |
| 2.6 grams | Sulfonated polystyrene cation exchange resin in the hydrogen cycle. | 2% based on ICA. |
| 0.035 gram | Methylene blue | 0.02% based on charge. |

The reaction mixture is heated under total reflux at 101° C. After 5 hours, the mixture is cooled to 50° C. and the pressure is reduced to 10 mm. Hg. The mixture is distilled to 100° C. to free it of butyl alcohol. The residue is cooled slightly and 300 ml. of benzene is added. The suspension is then cooled to 30° C. and about 24 grams of unreacted acid separates and is recovered by filtration. The benzene is removed by distillation at 10 mm. Hg pressure. There is obtained 130 grams of product, M.P. 32–34° C., with a monobutyl itaconate content of 97.0%. The 1.0 mole of itaconic acid is converted to 0.68 mole monoester, 0.02 mole diester and 0.28 mole is recovered unreacted.

EXAMPLE IV

The procedure of Example III is repeated substituting for n-butyl alcohol, stoichiometrically-equivalent amounts of ethyl alcohol, isopropyl alcohol and isobutyl alcohol. The respective beta-monoesters of itaconic acid are obtained in high yield.

EXAMPLE V

The procedure of Example III is repeated substituting for 36.45 grams of water, 40.5 grams of water or 1.0 mole per mole of alcohol. The product, which weighs 120 grams assays 92.5% monoester. The 1.0 mole of itaconic acid is converted to 0.60 mole of monoester, 0.04 mole of diester and 0.36 mole of unreacted acid is recovered.

EXAMPLE VI

A reaction vessel is charged with the following reagents:

| | | |
|---|---|---|
| 130 grams | Itaconic acid (ICA) | 1.0 mole. |
| 72 grams | Methyl alcohol, commercial grade | 2.25 moles. |
| 4.05 grams | Water (0.1 mole/mole of alcohol) | 0.23 mole. |
| 2.6 grams | $NaHSO_4$ | 2% based on ICA. |
| 0.065 gram | Methylene blue | 0.02% based on charge. |

The mixture is heated under total reflux at 85° C. Acidity as itaconic acid is determined every ½ hour after 3 hours. After 6 hours, the pressure is reduced to 10 mm. Hg and methanol and water are removed to an internal temperature of 95° C. The mixture is cooled and ½ volume of benzene is added. Then the mixture is cooled to 55° C., and excess itaconic acid is filtered from the reaction mixture. The clear product is recovered by removing benzene by distillation. There is obtained 110 grams of product assaying 95% monoester. The 1.0 mole of itaconic acid is converted to 0.72 mole as monoester, 0.03 mole as diester and 0.25 mole is recovered as unreacted acid.

What is claimed is:

1. In the method of preparing beta-itaconic acid monoester by esterifying itaconic acid at a temperature from about 75 to about 175° C. with a primary monoalkanol having from 1 to 4 carbon atoms, the improvement which comprises initiating the reaction in the presence of from about 0.1 to about 1.0 mole of water per mole of said alcohol reactant and maintaining in the reaction mixture throughout the course of said esterification, at least said initial amount of water and up to 1.5 moles of water per mole of alcohol reactant introduced into the reaction mixture.

2. In the method of preparing beta-itaconic acid methyl monoester by esterifying itaconic acid at a temperature from about 75 to about 175° C. with methyl alcohol, the improvement which comprises initiating the reaction in the presence of from about 0.1 to about 0.3 mole of water per mole of said methyl alcohol reactant and maintaining in the reaction mixture throughout the course of said esterification, at least said initial amount of water and up to 1.5 moles of water per mole of alcohol reactant introduced into the reaction mixture.

3. In the method of preparing beta-itaconic acid n-butyl monoester by esterifying itaconic acid at a temperature from about 75 to about 175° C. with n-butyl alcohol, the improvement which comprises initiating the reaction in the presence of from about 0.8 to about 1.0 mole of water per mole of said n-butyl alcohol reactant and maintaining in the reaction mixture throughout the course of said esterification, at least said initial amount of water and up to 1.5 moles of water per mole of alcohol reactant introduced into the reaction mixture.

References Cited

UNITED STATES PATENTS

| 3,057,909 | 10/1962 | Sebelist et al. | 260—475 |
| 2,766,273 | 5/1951 | Bruins et al. | 260—484 |
| 3,056,829 | 10/1962 | Messina et al. | 260—485 |

FOREIGN PATENTS

| 793,160 | 4/1958 | Great Britain. |

LORRAINE A. WEINBERGER, Primary Examiner

E. J. SKELLY, Assistant Examiner